(12) United States Patent
Matsuura

(10) Patent No.: US 7,628,496 B2  
(45) Date of Patent: Dec. 8, 2009

(54) ANTIGLARE FILM AND TRANSMISSION-TYPE LIQUID CRYSTAL DISPLAY

(75) Inventor: Yu Matsuura, Tokyo (JP)

(73) Assignee: Toppan Printing Co., Ltd. (JP)

( * ) Notice: Subject to any disclaimer, the term of this patent is extended or adjusted under 35 U.S.C. 154(b) by 155 days.

(21) Appl. No.: 11/879,883

(22) Filed: Jul. 18, 2007

(65) Prior Publication Data

US 2008/0186582 A1 Aug. 7, 2008

(30) Foreign Application Priority Data

Feb. 2, 2007 (JP) ............... 2007-024015

(51) Int. Cl.  
  *G02B 27/00* (2006.01)
(52) U.S. Cl. ................. 359/601; 359/599
(58) Field of Classification Search ........ 359/599, 359/601  
  See application file for complete search history.

(56) References Cited

U.S. PATENT DOCUMENTS

2007/0253064 A1* 11/2007 Ookubo et al. ........... 359/599

2008/0030861 A1* 2/2008 Ookubo et al. ........... 359/601

FOREIGN PATENT DOCUMENTS

| JP | 11-160505 | 6/1999 |
|----|-----------|--------|
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

*Primary Examiner*—Lee Fineman  
(74) *Attorney, Agent, or Firm*—Squire, Sanders & Dempsey L.L.P.

(57) ABSTRACT

An antiglare film is disclosed including a transparent substrate; and an antiglare layer on the transparent substrate wherein concaves and convexes are formed on the surface of the layer. As for the surface of the antiglare layer, ten-point mean roughness Rz1 according to JIS-B0601-1994 is 0.4-0.9 µm when the cutoff value is 0.8 mm and ten-point mean roughness Rz2 according to JIS-B0601-1994 is 0.02-0.06 µm when the cutoff value is 0.008 mm.

8 Claims, 5 Drawing Sheets

Roughness curve in the case where cutoff value (λc) is 0.8mm. Ten-point mean roughness (Rz1) is determined from the roughness curve.

Roughness curve in the case where cutoff value (λc) is 0.008mm. Ten-point mean roughness (Rz2) is determined from the roughness curve.

(a)

(b)

ANTIGLARE FILM AND TRANSMISSION-TYPE LIQUID CRYSTAL DISPLAY

CROSS REFERENCE

This application claims priority to Japanese application number 2007-024015, filed on Feb. 2, 2007, which is incorporated by reference.

BACKGROUND OF THE INVENTION

1. Field of the Invention

The present invention relates to an antiglare film to be provided on the surface of a window, display etc. In particular, it relates to an antiglare film to be provided on the surface of such displays as a liquid crystal display (LCD), cathode-ray tube (CRT) display, plasma display (PDP), organic electroluminescence display (ELD) and field effect display (FED, SED).

2. Description of the Related Art

Displays such as a liquid crystal display, CRT display, EL display and plasma display have the following problems from the viewpoint of visibility:

External light reflects at looking and listening.

Surface glare (scintillation) occurs at the display surface by display light from the display.

Poor visibility caused by dazzle of display light directly coming from the display without being diffused, etc.

Visibility is also degraded by such defect as unevenness of brightness.

In order to solve such lowering or degradation of visibility, it is known to arrange an antiglare film with an uneven surface on the front face of a display.

As an antiglare film, for example, the following techniques are known:

To arrange, on the surface of a display, an antiglare film having an antiglare light diffusing layer having been subjected to embossing finish.

To arrange, on the surface of a display, an antiglare film having an antiglare light diffusing layer on the surface of which is formed irregularity by mixing particles in a binder matrix.

In such antiglare film, scattering phenomenon (surface diffusion) of light caused by surface irregularity is utilized.

Further, such antiglare film is also known that, by mixing particles having a refraction index different from that of a binder matrix into the binder matrix, utilizes internal scattering (internal diffusion) of light based on the difference in refraction indices of the binder matrix and particles.

In an antiglare film on the surface of which is formed irregularity through embossing finish, the surface irregularity thereof can be completely controlled. Consequently, reproducibility is good. However, when there is a defect or an adhered foreign substance on an emboss roll, endless defects occurs at the pitch of roll. Consequently, in the case of mass production, all the products have defect. Further, since the scattering only at the surface is utilized, there are following problems:

Abrasion resistance

Lowering of contrast

Occurrence of dazzling

An antiglare film using a binder matrix and particles can be manufactured through a smaller number of processes than the antiglare film using embossing finish. Accordingly, it can be manufactured inexpensively. Therefore, various embodiments of antiglare film are known (Patent Document 1).

For example, following antiglare films are known.

It is necessary to improve visibility by preventing reflection of external light, scintillation etc. Therefore, following methods have been considered:

To improve light diffusing performance by making irregularity figure of the surface large.

To improve light diffusing performance by increasing the amount of particles to be added.

However, there is such problem in the methods that the sharpness of a transmitted image is lowered.

As methods for improving the visibility etc. without lowering light diffusing performance and the like, following techniques are known:

A technique in which binder matrix resin, spherical particles and amorphous particles are used in combination (Patent Document 2).

A technique in which binder matrix resin and plural particles having different particle sizes are used (Patent Document 3).

A technique including surface irregularity, wherein the cross-sectional area of the concave portion is defined (Patent Document 4).

In addition, in order to improve the visibility without lowering light diffusing performance etc., there is also known such technique that uses scattering in an antiglare film and scattering at the surface of antiglare film in combination.

The scattering within an antiglare film (internal diffusion) occurs by dispersing particles in a binder matrix such as resin of an antiglare film, the particles having refraction index different from that of the binder matrix. In order to exert sufficient light diffusing performance, it is necessary to form a certain degree of surface irregularity on the surface of antiglare film. However, there are following problems:

Lowering of contrast

Occurrence of dazzling caused by lens effect of the surface irregularity

Lowering of abrasion resistance

The combined use of internal scattering and surface scattering leads to smaller surface irregularity compared with an antiglare film using surface scattering alone. Therefore, there are following advantages:

Improvement of contrast

Reduction of dazzling caused by lens effect of the surface irregularity

Improvement of abrasion resistance

For example, as the technique using internal scattering and surface scattering in combination, following techniques are known:

A technique wherein the internal haze (cloudiness) is 1-15%, and the surface haze (cloudiness) is 7-30% (Patent Documents 5, 6).

A technique wherein, while using binder resin and particles having the particle size of 0.5-5 µm, the difference in refraction indices of the resin and the particle is 0.02-0.2 (Patent Document 7).

A technique wherein, while using binder resin and particles having the particle size of 1-5 µm, the difference in refraction indices of the resin and the particle is 0.05-0.15. Further, techniques defining a solvent to be used, surface roughness etc. (Patent Documents 8, 9, 10, 11, 12).

A technique wherein, using binder resin and plural types of particles, the difference in refraction indices of the resin and the particle is 0.03-0.2 (Patent Documents 13, 14).

There are also known following techniques that reduce lowering of contrast, hue variation etc. when a viewing angle is altered. In the technique, the surface haze (cloudiness) is 3 or more. Further, the difference between the haze value in the direction of normal line and the haze value in the direction of ±60° is 4 or less (Patent Documents 15, 16, 17, 18). A technique wherein center line average roughness (Ra) is 0.2 μm or less is also known (Patent Document 19). A technique wherein the center line average roughness (Ra) is 0.02-1 μm, and the ten point average roughness (Rz)/Ra is 30 or less is also known (Patent Document 20, 21).

Since an antiglare film is mainly arranged on the front face of a display, abrasion resistance is required. In order to improve the abrasion resistance, it is necessary to improve the hardness of an antiglare film. Therefore, there is known such technique as using an ionizing radiation-curing resin binder, silica particles and silicone particles in order to manufacture an antiglare film having a high hardness without lowering the display image quality of a display (Patent Document 21).

As described above, there are disclosed antiglare films of various constitutions for various purposes.

The performance required for an antiglare film differs depending on displays when it is used on the front face of a display. For example, the optimum antiglare film differs depending on the resolving power of a display, intended purpose etc. A broad range of antiglare films are required according to intended purposes.

Since an antiglare film has an antiglare layer of which surface has concaves and convexes, the film can scatter light and prevent external light from reflecting. However, in a case where the size of the concaves and convexes was increased in order to improve external light reflection preventive properties, the antiglare layer of the antiglare film was whitened. Since the external light preventive properties and the whitening degree were in a trade-off relation, it was difficult to obtain an antiglare film having high external light reflection preventive properties without the whitening. A purpose of the present invention, among others as will be evident to those skilled in the art, is to provide an antiglare film which is superior in external light reflection preventive properties without the whitening.

[Patent Document 1] U.S. Pat. No. 5,387,463
[Patent Document 2] JP-A-2003-260748
[Patent Document 3] JP-A-2004-004777
[Patent Document 4] JP-A-2003-004903
[Patent Document 5] Japanese Patent No. 3507719
[Patent Document 6] U.S. Pat. No. 6,343,865
[Patent Document 7] JP-A-11-326608
[Patent Document 8] Japanese Patent No. 3515426
[Patent Document 9] U.S. Pat. No. 6,696,140
[Patent Document 10] U.S. Pat. No. 7,033,638
[Patent Document 11] US Patent Published Application No. 2002-0150722
[Patent Document 12] US Patent Published Application No. 2004-0150874
[Patent Document 13] Japanese Patent No. 3515401
[Patent Document 14] U.S. Pat. No. 6,217,176
[Patent Document 15] JP-A-11-160505
[Patent Document 16] U.S. Pat. No. 6,111,699
[Patent Document 17] U.S. Pat. No. 6,327,088
[Patent Document 18] U.S. Pat. No. 6,480,249
[Patent Document 19] JP-A-2003-149413
[Patent Document 20] JP-A-2004-125958
[Patent Document 21] JP-A-2004-082613
[Patent Document 22] US Patent Published Application No. 2004-0071986

SUMMARY OF THE INVENTION

One embodiment of the present invention comprises an antiglare film comprising: a transparent substrate; and an antiglare layer on the transparent substrate wherein concaves and convexes are formed on the surface of the layer, wherein, as for the surface of the antiglare layer, ten-point mean roughness Rz1 according to JIS (Japanese Industry standard)-B0601-1994 is 0.4-0.9 μm when the cutoff value is 0.8 mm and ten-point mean roughness Rz2 according to JIS-B0601-1994 is 0.02-0.06 μm when the cutoff value is 0.008 mm.

In these drawings, 1 is an antiglare film; 11 is a transparent substrate; 12 is an antiglare layer; 120 is a binder matrix; 121A is a particle A; 121B is a particle B; His average film thickness of an antiglare layer; 2 is a polarizing plate; 21 is a transparent substrate; 22 is a transparent substrate; 23 is a polarizing layer; 3 is a liquid crystal cell; 4 is a polarizing plate; 41 is a transparent substrate; 42 is a transparent substrate; 43 is a polarizing layer; 5 is a backlight unit; and 7 is a polarizing plate unit.

DESCRIPTION OF THE PREFERRED EMBODIMENTS

Figure 1:
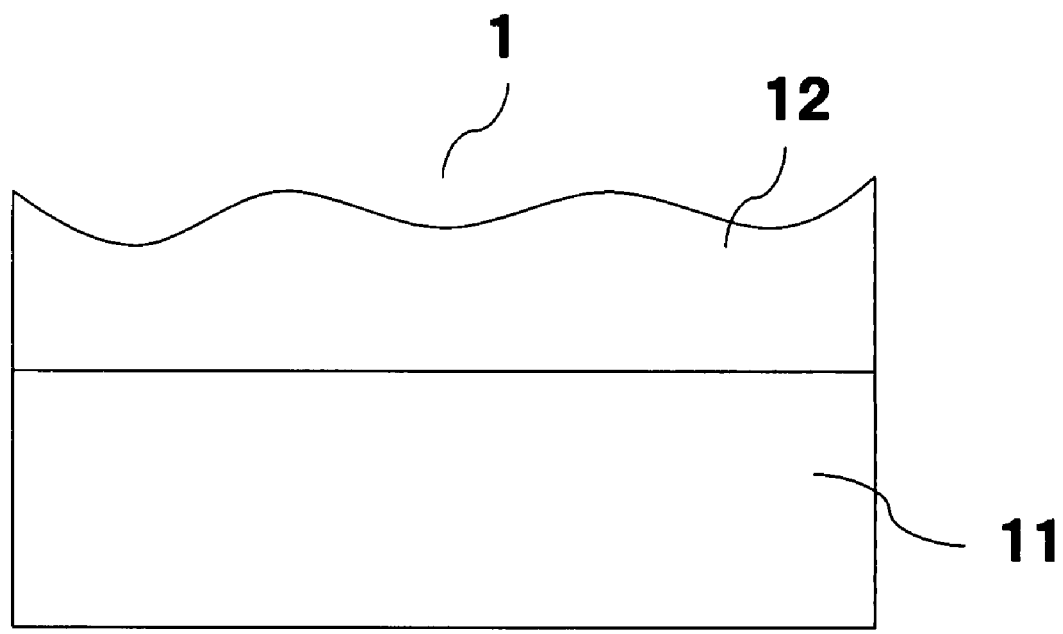
FIG. 1 is a cross section view of an antiglare light diffusing member of an embodiment of the present invention.

An antiglare film of embodiments of the present invention is explained below. FIG. 1 is a cross section view of an embodiment of an antiglare film of the present invention. An antiglare film (1) of an embodiment of the present invention has an antiglare layer (12) on a transparent substrate (11). And, as for the surface of the antiglare layer of the antiglare film of the present invention, ten-point mean roughness Rz1 according to JIS-B0601-1994 is 0.4-0.9 μm when the cutoff value is 0.8 mm and ten-point mean roughness Rz2 according to JIS-B0601-1994 is 0.02-0.06 μm when the cutoff value is 0.008 mm.

The λc is a cutoff value when a roughness curve is obtained from a profile curve in the evaluation of the surface roughness. That is, the λc is a parameter that determines a wavelength range of surface irregularity components eliminated from the profile curve. Ten-point mean roughness Rz varies depending on the λc. A smaller λc gives a roughness curve that reflects more components with a shorter wavelength from which irregular component of larger size is eliminated. Accordingly, a smaller λc gives ten-point mean roughness Rz that reflects finer irregularity components. On the other hand, a bigger λc gives ten-point mean roughness Rz that reflects bigger irregularity components.

The inventor of the present invention found the following fact about an antiglare film:

1. Ten-point mean roughness Rz1 when the cutoff value λc is 0.8 mm which reflects concaves and convexes of larger size is a parameter contributing to transforming an outline of a reflection image on an antiglare film.

2. Ten-point mean roughness Rz2 when the cutoff value $\lambda c$ is 0.008 mm which reflects concaves and convexes of smaller size is a parameter contributing to blurring an outline of a reflection image on an antiglare film.

Therefore, an antiglare film without the whitening, which is superior in external light reflection preventive properties, can be obtained by controlling Rz1 and Rz2 respectively.

In a case where ten-point mean roughness Rz1 when the cutoff value $\lambda c$ is 0.8 mm is less than 0.4 µm, external light reflection properties are not enough. In a case where ten-point mean roughness Rz1 when the cutoff value $\lambda c$ is 0.8 mm is more than 0.9 µm, an antiglare film is wholly whitened. In addition, in a case where ten-point mean roughness Rz2 when the cutoff value $\lambda c$ is 0.008 mm is less than 0.02 µm, external light reflection properties are not enough. In a case where ten-point mean roughness Rz2 when the cutoff value $\lambda c$ is 0.008 mm is more than 0.06 µm, an antiglare film is wholly whitened. That is, in a case where ten-point mean roughness Rz1 when the cutoff value $\lambda c$ is 0.8 mm is 0.4-0.6 µm and ten-point mean roughness Rz2 when the cutoff value $\lambda c$ is 0.008 mm is 0.02-0.06 µm, an antiglare film without the whitening, which is superior in external light reflection preventive properties, can be obtained.

In addition, in an antiglare film of embodiments of the present invention, it is desirable that haze value of an antiglare film is 30-39%. In a case where an antiglare film is placed on a surface of a display, dazzling may occur. Occurrence of dazzling becomes significant in a case where an antiglare film is placed on a surface of a high-definition display. In this case, dazzling can be controlled by setting haze value at 30-39%. In the present invention, if haze value is less than 30%, dazzling may not be controlled sufficiently. On the other hand, if haze value is more than 39%, contrast may be lowered.

Haze of an antiglare layer of an antiglare film is divided into surface haze by light scattering at concaves and convexes of a surface of the layer and internal haze by light scattering inside the layer. In an antiglare film of the present invention, by setting ten-point mean roughness Rz1 when the cutoff value $\lambda c$ is 0.8 mm) at 0.4-0.9 µm and setting ten-point mean roughness Rz2 when the cutoff value $\lambda c$ is 0.008 mm at 0.02-0.06 µm, surface haze value by concaves and convexes of the surface of the layer becomes about 4-6%. Therefore, by increasing internal haze value, haze value of the antiglare layer can be set at 30-39%. In addition, internal haze of the antiglare layer can be generated by forming areas in the layer, wherein refractive indexes of the areas are different from each other.

Figure 4:
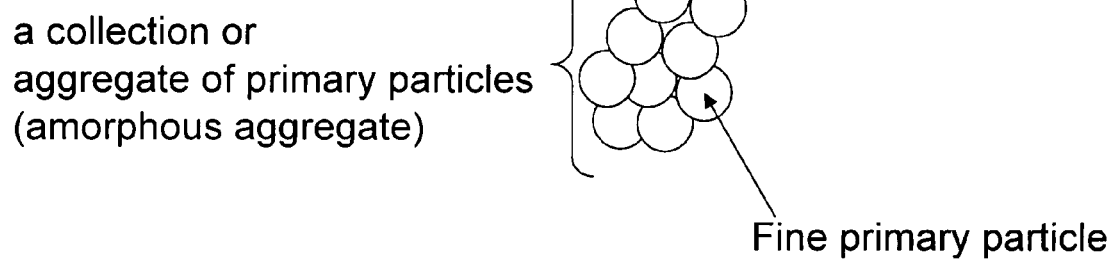
FIG. 4 illustrates a collection or aggregate of primary particles in accordance with various descriptive embodiments disclosed in the specification.
Figure 5:
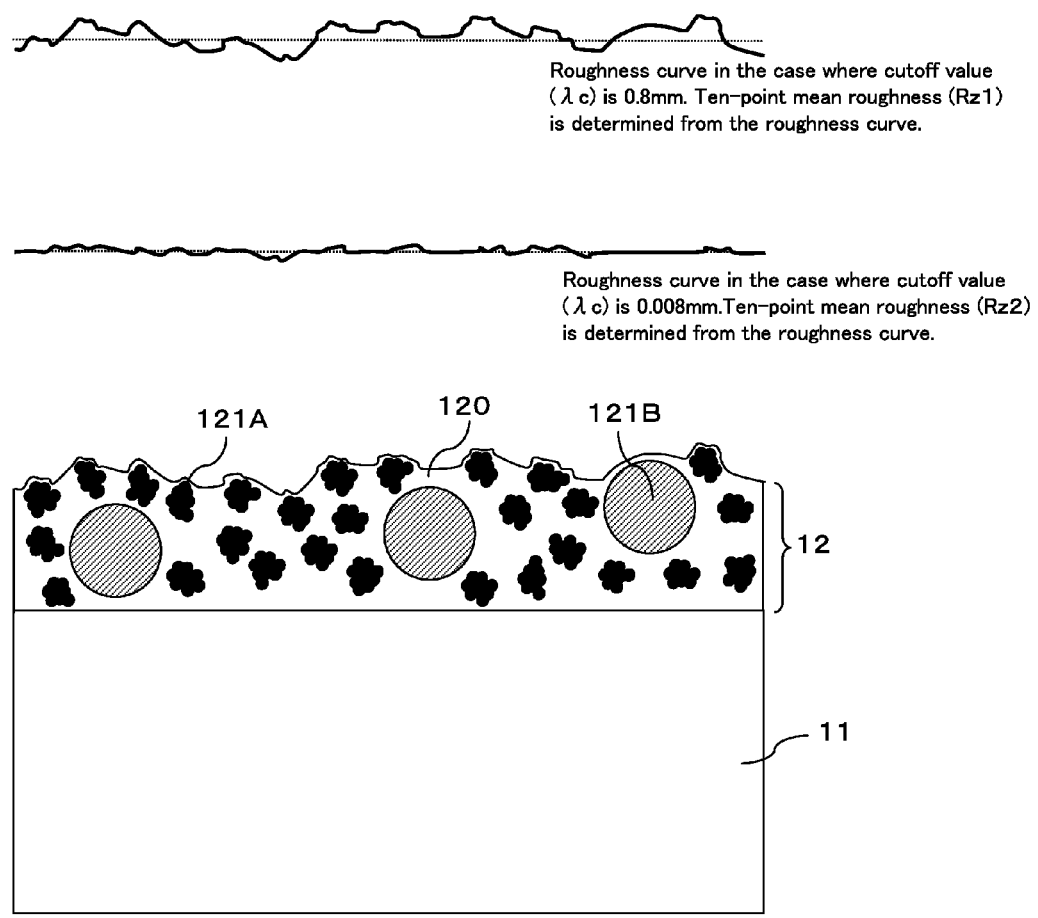
FIG. 5 is a schematic cross-sectional view of an embodiment of an antiglare film of the present invention, the view showing a roughness curve, a cutoff value and a ten-point mean roughness when the cutoff value is 0.8 mm or 0.008 mm.

In an antiglare layer of an antiglare film of the present invention, it is desirable that a particle which is an amorphous aggregate is used. A particle which is an amorphous aggregate means a collection or aggregate of primary particles. (See FIG. 4) The amorphous aggregate can form concaves and convexes of small size by the primary particle and concaves and convexes of big size by the collection of the primary particles in a surface of the antiglare layer. That is, by using amorphous aggregate particle for the antiglare layer of the antiglare film of the present invention ten-point mean roughness Rz1 when the cutoff value $\lambda c$ is 0.8 mm and ten-point mean roughness profile Rz2 when the cutoff value $\lambda c$ is 0.008 mm can be easily set at a desired value.

It is desirable that an antiglare layer of an antiglare film of the present invention contains a binder matrix and a particle of which refractive index is different from refractive index of the binder matrix. In order to set haze value of an antiglare layer of an antiglare film of the present invention at 30-39%, light incident on the antiglare layer should be scattered, that is, the antiglare layer should have internal haze. In order to an antiglare layer having internal haze, it is necessary to form an area of which refractive index is different from refractive index of a binder matrix. Therefore, it is desirable that an antiglare layer comprises a binder matrix and a particle having refractive index different from refractive index of the binder matrix.

In a case where an amorphous aggregate particle is used in the present invention, it is desirable that difference in refractive index between an amorphous aggregate particle and a binder matrix is 0.03-0.20. When the difference in refractive index is within the above mentioned range, as for light incident on inside of an antiglare layer, internal diffusion can occur and dazzling can be controlled. When difference in refractive index between a particle and a binder matrix is less than 0.03, internal diffusion is not enough and it is difficult to achieve a desired haze value. When difference in refractive index between a particle and a binder matrix is more than 0.20, an antiglare layer is easily whitened.

In addition, in the present invention, since a binder matrix can include two or more kinds of particles, it is further easy for ten-point mean roughness Rz1 when the cutoff value $\lambda c$ is 0.8 mm and ten-point mean roughness Rz2 when the cutoff value $\lambda c$ is 0.008 mm to be set at a desired value.

In addition, in the present invention, since a binder matrix can include two or more kinds of particles, it is further easy for ten point height of roughness profile Rz1 (cutoff wavelength $\lambda c$: 0.8 mm) and ten point height of roughness profile Rz2 (cutoff wavelength $\lambda c$: 0.008 mm) to be set at a desired value.

Figure 2:
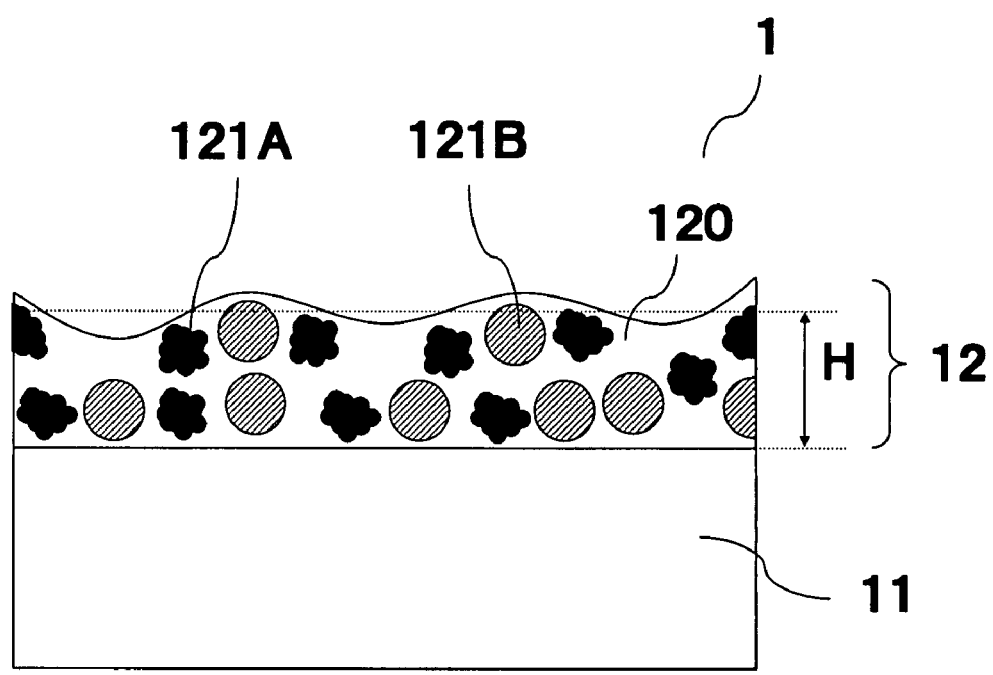
FIG. 2 is another embodiment of an antiglare film of the present invention.

In this case, as a particle included in a binder matrix, particle A which is amorphous aggregate and particle B which is spherical are preferably used. Since a spherical particle is small in backward scattering compared with amorphous aggregate, lowering of contrast can be controlled when a spherical particle is arranged in front surface of a display. Therefore it is desirable that both particle A which is amorphous aggregate and particle B which is spherical are used. FIG. 2 shows a cross section view of another embodiment of an antiglare film of the present invention. In FIG. 2, an antiglare film comprises an antiglare layer (12) on a transparent substrate (ii), wherein an antiglare layer (12) comprises a binder matrix (120) and two kinds of particles (particle A (121A) and particle B (121B)). Particle A is amorphous aggregate and particle B is spherical.

In a case where particle A which is amorphous aggregate and particle B which is spherical are used, it is desirable that difference in refractive index between particle A and a binder matrix is 0.03-0.20 and difference in refractive index between particle B and a binder matrix is 0.03-0.20. Since difference in refractive index is within the above mentioned range, as for light incident on inside of an antiglare layer, internal diffusion can be generated and dazzling can be controlled. In a case where difference in refractive index between "particle A or particle B" and a binder matrix is less than 0.03, internal diffusion may be not enough and it is difficult to achieve a desired haze value. In addition, in a case where difference in refractive index between "particle A or particle B" and a binder matrix is more than 0.20, an antiglare layer may be easily whitened.

In addition, in a case where particle A which is amorphous aggregate and particle B which is spherical are used in the present invention, it is desirable that total content of particle A and particle B is 10-40 wt % based on content of a binder matrix. In a case where total content of particle A and particle B is less than 10 wt %, it is difficult to obtain an antiglare film which is superior in external light reflection preventive properties. In addition, in a case where total content of particle A and particle B is more than 40 wt %, an antiglare layer may be whitened.

In addition, as for an antiglare layer of an antiglare film of the present invention, it is desirable that average film thickness H of the layer is 4-25 μm. In a case where average film thickness H of the layer is less than 4 μm, the layer has not enough hardness, therefore the layer can not be installed in front surface of a display. In a case where average film thickness H of the layer is more than 25 μm, the cost becomes too high. In addition, average film thickness of an antiglare layer means average value of film thickness of the antiglare layer of which surface has concaves and convexes. Average value of film thickness can be found by using an electronic micrometer and a fully automatic machine for measuring fine shape.

In a case where average film thickness of an antiglare layer is 4-25 μm, as for particle A which is amorphous aggregate comprising a collection of primary particles, it is desirable that average particle diameter is 0.003-0.1 μm and average fine particle of a collection of primary particles is 0.5-3.0 μm. In addition, it is desirable that average particle diameter of spherical particle B is 2-8 μm.

In a case where average particle diameter of a primary particle of particle A which is amorphous aggregate is less than 0.003 μm, since a surface of a collection of primary particles is smooth, light scattering performance tends to be poor. In addition, in a case where average particle diameter of a primary particle is more than 0.1 μm, the size of concaves and convexes in a surface of a collection of primary particles is too big, therefore light scattering performance tends to be too much. Therefore, it is desirable that average particle diameter of a primary particle of particle A is 0.003-0.1 μm. In addition, in a case where average particle diameter of a collection of primary particles of particle A which is amorphous aggregate is less than 0.5 μm, light scattering performance tends to be poor, and in a case where average particle diameter of a collection of primary particles of particle A which is amorphous aggregate is more than 3.0 μm, light scattering performance tends to be too much. It is desirable that average particle diameter of a collection of primary particles which a primary particle of particle A is aggregated is 0.5-3.0 μm. In addition, in a case where average particle diameter of a spherical particle B is less than 2 μm, light scattering performance tends to be poor, and in a case where average particle diameter of a spherical particle B is more than 8 μm, light scattering performance tends to be too much. It is desirable that average particle diameter of spherical particle B is 2-8 m.

In addition, particle diameter of a primary particle of an amorphous particle can be measured by a method for measuring particle diameter distribution based on light scattering. Particle diameter of a collection of primary particles and average particle diameter of a spherical particle can be measured by the same method.

In addition, in a case where particle A which is amorphous aggregate and particle B which is spherical are used in the present invention, in order to set easily ten-point mean roughness Rz1 when the cutoff value λc is 0.8 mm and ten-point mean roughness Rz2 when the cutoff value λc is 0.008 mm at a desired value, difference in average particle diameter between a collection of primary particles of particle A and spherical particle B is equal to or more than 1 μm. In addition, in order to set easily haze value of an antiglare layer at a desired value, difference in refractive index between particle A and particle B is equal to or more than 0.08.

In addition, in the present invention, surface hardness of an antiglare layer should be equal to or more than 3H according to pencil hardness (JIS K5400). More preferably, it is more than 4H. In a case where pencil hardness is equal to or more than 3H, more preferably equal to or more than 4H, an antiglare film installed on a front surface of a display has enough scratching resistance.

In addition, in an antiglare film of the present invention, to the binder matrix, other functional additives may be added. But, other functional additives must not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare light diffusing layer can have functions such as an antistatic function, an ultraviolet absorbing function, an infrared absorbing function, an antifouling function and a water repellent function besides an antiglare function.

In addition, an antiglare film can have a functional layer having a performance such as reflection preventing performance, antistatic performance, antifouling performance, electromagnetic shield performance, infrared absorbing performance, ultraviolet absorbing performance and color correcting performance. Examples of these functional layers include a reflection preventing layer, an antistatic layer, an antifouling layer, an electromagnetic shield layer, an infrared absorbing layer, an ultraviolet absorbing layer, a color correcting layer and the like. In addition, these functional layers may consist of one layer or a plural of layers. One embodiment of the functional layer is that a functional layer consisting of one layer has a plural of functions. For example, a reflection preventing layer having antifouling performance can be adopted. In addition, to improve adhesion property between a transparent base material and an antiglare layer or between some kinds of layers, a primer layer, an adhesion layer and the like can be provided between some layers.

Figure 3:
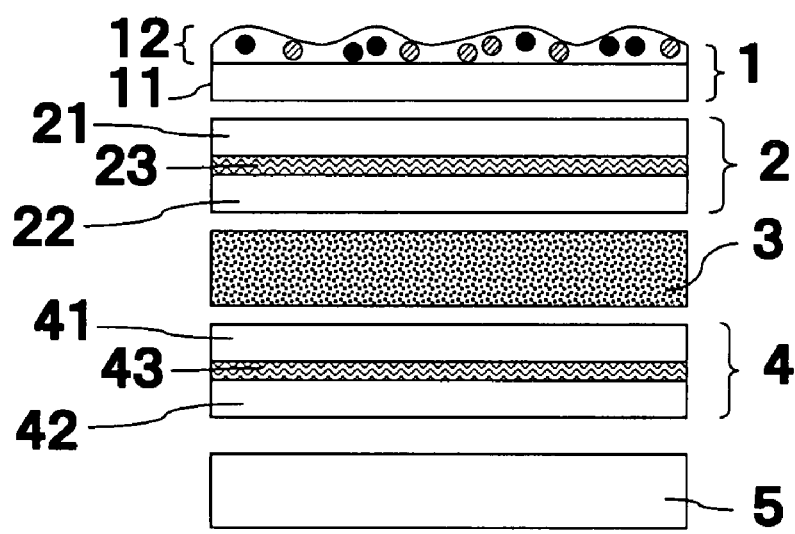
FIG. 3 is a cross section view of a transmission type liquid crystal display using an antiglare film of the present invention.
Figure 3:
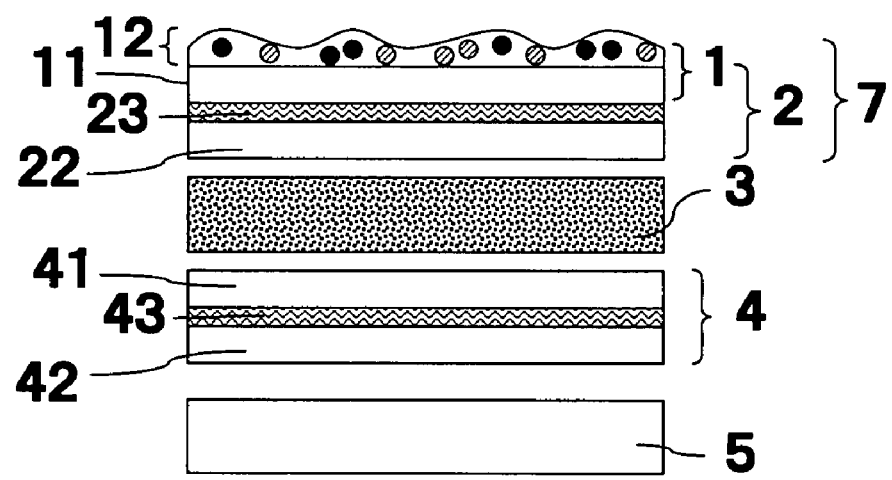

FIG. 3 is a cross-sectional view showing a transmission type liquid crystal display with the use of an antiglare film of an embodiment of the present invention. A transmission type liquid crystal display shown in FIG. 3(a) has a backlight unit (5), a polarization plate (4), a liquid crystal cell (3), a polarization plate (2) and an antiglare film (1) in this order. In this embodiment, an antiglare film (1) side is an observer side, that is, a front surface of a display.

A backlight unit (5) comprises a light source and a light diffusing plate. As for a liquid crystal cell, an electrode is provided on a transparent substrate in one side, an electrode and a color filter are provided on a transparent substrate in another side and a liquid crystal is encapsulated between both of the electrodes. As for polarization plates sandwiching a liquid crystal cell (3), polarization layers (23, 43) are between transparent substrates (21, 22, 41 and 42).

A transmission type liquid crystal display shown in FIG. 3(b) has a backlight unit (5), a polarization plate (4), a liquid crystal cell (3) and a polarization plate unit (7) which a polarization plate (2) combines with an antiglare film (1), in this order.

As for an antiglare light diffusing member used for a liquid crystal display, as shown in FIG. 3(b), a polarization layer (23) can be provided on a surface of a transparent substrate (11) opposite to a surface where an antiglare layer (12) is formed, and the transparent substrate (11) can be used as a polarization plate.

Next, a manufacturing method of an antiglare film of the present invention is described below.

As the substrate for use in the antiglare film of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

When the antiglare film is used on the front face of a liquid crystal display etc., triacetylcellulose (TAC) is used preferably because it does not show optical anisotropy.

Further, a polarizing plate may be used as the substrate. There is no particular limitation on a polarizing plate to be used. For example, such polarizing plate can be used that has a stretched polyvinyl alcohol (PVA) added with iodine as a polarizing layer between a pair of triacetylcellulose (TAC) films which are supporting bodies of a polarizing layer. A polarizing plate composed of a TAC film and a stretched PVA added with iodine has a high polarization degree and can be used suitably for a liquid crystal display etc. In this case, an antiglare layer can be provided on one of triacetylcellulose (TAC) films.

In addition, as for a transparent base material for the present invention, from the viewpoint of optical property, mechanical strength, handleability etc., the thickness of the base material is preferably 10-500 μm.

To the base material, an additive may be added. Examples of the additive include an ultraviolet absorber, infrared absorber, antistatic agent, refraction index-adjusting agent and reinforcing agent.

For the binder matrix for use in the antiglare layer, following properties are required:

When a film is formed using the binder matrix, the film has proper degree of transparency and mechanical strength.

Added particles are dispersed in the binder matrix.

For example, ionizing radiation-curable resin such as ultraviolet ray-curable resin and electron beam-curable resin, heat-curable resin, thermoplastic resin, and an inorganic or organic-inorganic composite matrix obtained by hydrolyzing and dehydration-condensing metal alkoxide can be used.

Examples of the heat-curable resin include heat curable type urethane resin composed of acrylic polyol and isocyanate prepolymer, phenol resin, urea-melamine resin, epoxy resin, unsaturated polyester resin and silicone resin.

Examples of the ionizing radiation-curable resin include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

Among the ionizing radiation-curable resin, when ultraviolet ray-curable resin is used, a photopolymerization initiator is added. Any photopolymerization initiator may be usable, but the use of one suitable for a resin to be used is preferred.

As the photopolymerization initiator (radical polymerization initiator), benzoin and alkyl ethers thereof such as benzoin, benzoinmethylether, benzoinethylether, benzoinisopropylether and benzylmethylketal are used. The use amount of the photosensitizing agent is 0.5-20 wt %, preferably 1-5 wt % relative to the resin.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

Examples of the usable inorganic or organic-inorganic composite matrix include materials using silicon oxide-based matrix employing a silicon alcoxide-based material as a starting material. For example, tetraethoxysilane can be used.

When the substrate is made of a plastic film, in order to supply mechanical strength, a binder matrix having a high hardness is preferably used. Specifically, resin having a high hardness, and inorganic or organic-inorganic composite matrix obtained by hydrolyzing and dehydration-condensing metal alkoxide can be used. In particular, when using a plastic film having a thickness of 100 μm or less, the use of a binder matrix having a high hardness is preferred.

Especially, the use of an ionizing radiation-curable resin such as an ultraviolet ray-curable resin and an electron beam-curable resin for a binder matrix of an antiglare film of the present invention is preferable. The use of ionizing radiation-curable resin makes it possible to manufacture an antiglare layer having a certain degree of flexibility, no crack and high hardness which surface hardness is, for example, beyond 3H.

As mentioned above, a refractive index of a binder matrix for the present invention means a refractive index of a film after the film is formed by using a binder matrix. That is, in a case where curable resin is used, a refractive index of a binder matrix means a refractive index of a film after the film is formed by curing the curable resin. A refractive index of a binder matrix is a measured value by using a binder matrix without a particle for measurement.

Amorphous aggregate used in the present invention can be a particle comprising a collection of primary particles with which a fine primary particle is aggregated. As an amorphous aggregate used in an antiglare layer of an antiglare film of the present invention, an inorganic particle can be used. An inorganic fine particle are selected from silica particle (refractive index 1.46), talc (refractive index 1.54), various aluminosilicate (refractive index 1.50-1.60), kaolin clay (refractive index 1.53), MgAl hydrotalcite (refractive index 1.50) and the like. However, usable particles are not limited to the above mentioned particles.

As a spherical particle used in an antiglare layer of an antiglare film of the present invention, an organic particle can be used. An organic particle are selected from acryl particle (refractive index 1.49), acryl-styrene particle (refractive index 1.49-1.59), styrene particle (refractive index 1.59), acryl styrene particle (refractive index 1.58), polycarbonate particle (refractive index 1.58), melamine particle (refractive index 1.66) and the like. However, usable particles are not limited to the above mentioned particles. In addition, the spherical particle includes a perfect spherical particle and ellipse-sphere.

An antiglare light diffusing layer can be obtained by the following processes: a coating liquid including a starting material of a binder matrix and the particle is applied to a base material; and this coating liquid on a base material is dried and cured.

The coating liquid may contain a solvent according to need.

The solvent must be able to disperse the starting material of the binder matrix and the particle. Further, the solvent is required to be provided with coating aptitude. For example, toluene, cyclohexanone, acetone, ketone, ethylcellosolve, ethylacetate, butylacetate, methyl isobutyl ketone, isopropanol methyl ethyl ketone, cyclohexanone, tetrahydrofuran, nitromethane, 1,4-dioxan, dioxolane, N-methylpyrrolidone, ethyl acetate, methyl acetate, dichloromethane, trichloromethane, trichloroethylene, ethylene chloride, trichloroethane, tetra chloroethane, N,N-dimethylformamide and chloroform can be used. In addition a combined solvent thereof can be used.

The amount of the solvent is not particularly limited.

In addition, a solvent which can dissolve a substrate can be used. Especially, in a case where triacetylcellulose (TAC) is used for a substrate and an antiglare layer is formed on the substrate made of triacetylcellulose, it is desirable that a solvent which can dissolve triacetylcellulose is used in order to improve adhesion properties between an antiglare layer and a substrate. More preferably, a mixed solvent comprising a solvent which dissolves a substrate and a solvent which does not dissolve a substrate is used.

A coating method using a roll coater, a reverse roll coater, a gravure coater, a knife coater, a bar coater or a slot die coater can be used.

The solid content concentration of the coating liquid differs depending on a coating method. The solid content concentration may be around 30-70 wt % in weight ratio.

A case where a curable resin is used as a binder matrix and an antiglare layer is formed will be described. The above-described coating liquid is coated on the substrate. Then, by applying external energy such as ultraviolet rays, electron beams or heat to the coated layer, the coated layer is cured. Thus, the antiglare layer is formed.

In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after the curing process, a drying process may be provided. The curing and drying may be effected simultaneously.

Examples of drying means include heating, air blowing and hot air blowing.

A method for forming the antiglare layer using a thermoplastic binder matrix will be described below. The coating liquid is coated on the substrate. Then, the coated layer is dried. Thus the antiglare layer is formed. Examples of drying means include heating, air blowing and hot air blowing.

A method for forming the antiglare layer using an inorganic or organic-inorganic composite matrix will be described below. The coating liquid is coated on the substrate. Then, by applying external energy such as ultraviolet rays, electron beams or heat, the coated layer is cured. Thus, the antiglare layer is formed.

Before and after the curing process, a drying process may be provided. The curing and drying may be effected simultaneously.

Examples of drying means include heating, air blowing and hot air blowing.

When a polarizing plate having a polarizing layer between a pair of supports for the polarizing layer is used as a substrate, a method for manufacturing the antiglare film will be described below.

First, on a first support for the polarizing layer, the antiglare layer is provided by a method similar to the method described above.

In addition, in the present invention, concaves and convexes of a surface of an antiglare layer can be formed by embossing. In addition, concaves and convexes of a surface of an antiglare layer can be formed by embossing while a particle is included in an antiglare layer in order to set haze value at a desired value.

Next, on the side of the first support for the polarizing layer facing to the side provided with the antiglare layer, a polarizing layer is provided. When the polarizing plate is composed of a TAC film and stretched PVA film added with iodine, the stretched PVA film added with iodine is laminated while being stretched on the support for the polarizing layer to provide the polarizing layer.

Next, a second support for the polarizing layer is provided on the polarizing layer.

Another method for manufacturing the antiglare film will be described below.

First, a polarizing plate having a polarizing layer between a pair of supports for the polarizing layer is prepared. Then, the antiglare layer is provided on one of the supports for the polarizing layer.

As mentioned above, in an antiglare film of the present invention, to the binder matrix, other functional additives may be added. But, other functional additives must not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare layer can have functions such as an antistatic function, an ultraviolet absorbing function, an infrared absorbing function, an antifouling function and a water repellent function besides an antiglare function.

In addition, an antiglare film can include a functional layer having reflection preventing performance, antistatic performance, antifouling performance, electromagnetic shield performance, infrared absorbing performance, ultraviolet absorbing performance, color correction performance or the like. And, a primer layer, an adhesion layer and the like can be provided between some layers to improve adhesion property between some kinds of layers.

Hereinafter, Examples and Comparative Examples are shown.

Example 1

A triacetylcellulose film (TD-80U, manufactured by Fuji Photo Film Co., LTD.; refraction index 1.49, film thickness 80 μm) was used as a transparent base material. On the transparent base material, an antiglare light diffusing coating liquid having the composition shown in Table 1 and Table 2 was coated with a slot die coater. Then, a solvent included in the coating liquid was evaporated. Then, the antiglare light diffusing layer was cured through ultraviolet irradiation of 400 mJ using a high-pressure mercury lamp under an atmosphere of 0.03% or less of oxygen concentration. The dried antiglare light diffusing layer had a thickness of 6.5 μm. Thus, a sample was prepared.

Example 2

An antiglare layer was prepared same as example 1 with the use of an antiglare light diffusing coating liquid having the composition shown in Table 1. The weight ratio of composition of example 2 was different from that of example 1. The dried and cured antiglare layer had a thickness of 6.2 μm. Thus, a sample was prepared.

Example 3

An antiglare layer was prepared same as example 1 with the use of an antiglare light diffusing coating liquid having the composition shown in Table 1. The weight ratio of composition of example 3 was different from that of example 1. The dried and cured antiglare layer had a thickness of 6.0 μm. Thus, a sample was prepared.

Example 4

An antiglare layer was prepared same as example 1 with the use of an antiglare light diffusing coating liquid having the composition shown in Table 1. The weight ratio of composition of example 4 was different from that of example 1. The dried and cured antiglare layer had a thickness of 6.4 μm. Thus, a sample was prepared.

Comparative Example 1

An antiglare layer was prepared same as example 1 with the use of an antiglare light diffusing coating liquid having the composition shown in Table 1. The weight ratio of composition of comparative example 1 was different from that of example 1. The dried and cured antiglare light diffusing layer had a thickness of 5.9 μm. Thus, a sample was prepared.

Comparative Example 2

An antiglare layer was prepared same as example 1 with the use of an antiglare light diffusing coating liquid having the composition shown in Table 1. The weight ratio of composition of comparative example 2 was different from that of example 1. The dried and cured antiglare light diffusing layer had a thickness of 6.0 μm. Thus, a sample was prepared.

Comparative Example 3

An antiglare layer was prepared same as example 1 with the use of an antiglare light diffusing coating liquid having the composition shown in Table 1. The weight ratio of composition of comparative example 3 was different from that of example 1. The dried and cured antiglare light diffusing layer had a thickness of 5.6 μm. Thus, a sample was prepared.

Comparative Example 4

An antiglare layer was prepared same as example 1 with the use of an antiglare light diffusing coating liquid having the composition shown in Table 1. The weight ratio of composition of comparative example 4 was different from that of example 1. The dried and cured antiglare light diffusing layer had a thickness of 6.8 μm. Thus, a sample was prepared.

TABLE 1

| | | | |
|---|---|---|---|
| binder | pentaerythritol acrylate (PE3, manufactured by KYOEISHA CHEMICAL Co., LTD.) | Refractive index 1.52 | — |
| Particle A | Silica particle (SS50F, manufactured by TOSOH SILICA CORPORATION) | Refractive index 1.46 | Diameter of a primary particle: 0.02 μm Diameter of a a collection of primary particles: 1.1 μm |
| Particle B | styrene bead (SX-350H, manufactured by Soken Chemical & Engineering Co., Ltd.) | Refractive index 1.59 | Particle diameter: 3.5 μm |
| photo-polymerization initiator | Irgacure 184 (manufactured by Ciba Specialty Chemicals) | — | — |
| solvent | toluene | — | — |

TABLE 2

| | | | |
|---|---|---|---|
| Example 1 | binder | 100 part by weight | Average film thickness of an antiglare layer: 6.5 μm |
| | Particle A | 8 part by weight | |
| | Particle B | 8 part by weight | |
| | photopolymerization initiator | 5 part by weight | |
| | solvent | 121 part by weight | |
| Example 2 | binder | 100 part by weight | Average film thickness of an antiglare layer: 6.2 μm |
| | Particle A | 15 part by weight | |
| | Particle B | 10 part by weight | |
| | photopolymerization initiator | 5 part by weight | |
| | solvent | 130 part by weight | |
| Example 3 | binder | 100 part by weight | Average film thickness of an antiglare layer: 6.0 μm |
| | Particle A | 13 part by weight | |
| | Particle B | 6 part by weight | |
| | photopolymerization initiator | 5 part by weight | |
| | solvent | 124 part by weight | |
| Example 4 | binder | 100 part by weight | Average film thickness of an antiglare layer: 6.4 μm |
| | Particle A | 15 part by weight | |
| | Particle B | 13 part by weight | |
| | photopolymerization initiator | 5 part by weight | |
| | solvent | 133 part by weight | |
| Comparative Example 1 | binder | 100 part by weight | Average film thickness of an antiglare layer: 5.9 μm |
| | Particle A | 5 part by weight | |
| | Particle B | 6 part by weight | |
| | photopolymerization initiator | 5 part by weight | |
| | solvent | 116 part by weight | |
| Comparative Example 2 | binder | 100 part by weight | Average film thickness of an antiglare layer: 6.0 μm |
| | Particle A | 20 part by weight | |
| | Particle B | 12 part by weight | |
| | photopolymerization initiator | 5 part by weight | |
| | solvent | 137 part by weight | |
| Comparative Example 3 | binder | 100 part by weight | Average film thickness of an antiglare layer: 5.6 μm |
| | Particle A | 14 part by weight | |
| | Particle B | 4 part by weight | |
| | photopolymerization initiator | 5 part by weight | |
| | solvent | 123 part by weight | |
| Comparative Example 4 | binder | 100 part by weight | Average film thickness of an antiglare layer: 6.8 μm |
| | Particle A | 15 part by weight | |
| | Particle B | 18 part by weight | |
| | photopolymerization initiator | 5 part by weight | |
| | solvent | 138 part by weight | |

In these cases, refractive index of a particle was measured according to the Becke line-detecting method (immersion method) using optical microscope. In addition, refractive index of a binder matrix was measured by the following method: coating liquid of example 1 without particle A and particle B was coated, dried and cured by the method described in example 1; refractive index of a film obtained in this way was measured.

In addition, average particle diameter of a primary particle of particle A, average particle diameter of a collection of primary particles of particle A and average particle of particle B were measured using a particle size distribution measuring apparatus of a light diffusing system (SALD-7000, manufactured by Shimadzu Corporation). Average film thickness of an antiglare layer was measured using a film thickness meter (TH-102, manufactured by TESTER SANGYO CO, LTD.)

Measuring Method of Ten-Point Mean Roughness (Rz1, Rz2)

Rz1 when the cutoff value λc is 0.8 mm and Rz2 when the cutoff value λc is 0.008 mm were measured using a high accuracy micro figure measuring instrument (SURF CORDER ET4000A, manufactured by Kosaka Laboratory Ltd.) on the basis of JIS-B0601-1994 (evaluation length=8 mm, scanning rate=0.005 mm/sec).

Measuring Method of Haze

The haze was measured using a haze meter (NDH2000, NIPPON DENSHOKU) according to JIS K7105.

Evaluation Method of Reflection Property of External Light

Respective samples were laminated to respective black plastic plates and, in that state, the reflection of fluorescent light was evaluated visually. The judgment standard is shown below.

◎: reflection is indistinctive.
○: reflection is recognized a little.
x: reflection is recognized.

Evaluation Method of Whitening Level

Respective samples were laminated to respective black plastic plates using adhesive and fluorescent light was reflected in respective samples, in that state, level of light diffusing in entire of respective samples was evaluated. The judgment standard is shown below.

◎: whitening in entire sample is not observed.
○: whitening is observed a little, and is within accepted range.
x: Whitening is observed, and is beyond accepted range.

Evaluation Method of Dazzling

A glass substrate with a black matrix (BM) of 80-200 ppi pattern was placed on a light table incorporating fluorescent light tubes and a glass substrate with an antiglare film was placed on the glass substrate with the black matrix. In this state, dazzling of an antiglare layer was evaluated by eyes. In this evaluation, the biggest value among resolutions of BM which dazzling was not observed was determined to be the corresponding resolution.

◎: the corresponding resolution is bigger than 150 ppi.
○: the corresponding resolution is 100-150 ppi.
x: the corresponding resolution is less than 100 ppi.

Measurement result and evaluation result of respective samples are shown in TABLE 3. As shown in Example 1-4, superior samples without whitening and with enough external light preventive properties were obtained by setting Rz1 and Rz2 at a desired value. In addition, as shown in Example 1, 2 and 4, dazzling was controlled by setting haze at 3-39%.

TABLE 3

| | ten-point mean roughness | | | External light preventive properties | Whitening level | dazzling |
|---|---|---|---|---|---|---|
| | Rz1 ($\mu$m) | Rz2 ($\mu$m) | Haze (%) | | | |
| Example 1 | 0.6 | 0.02 | 30 | ◎ | ◎ | ◎ |
| Example 2 | 0.9 | 0.05 | 35 | ◎ | ○ | ◎ |
| Example 3 | 0.4 | 0.04 | 25 | ○ | ◎ | ○ |
| Example 4 | 0.8 | 0.06 | 39 | ◎ | ○ | ◎ |
| Comparative Example 1 | 0.6 | 0.01 | 25 | x | ◎ | ○ |
| Comparative Example 2 | 0.8 | 0.08 | 38 | ◎ | x | ◎ |
| Comparative Example 3 | 0.3 | 0.04 | 15 | x | ◎ | x |
| Comparative Example 4 | 1.0 | 0.06 | 50 | ◎ | x | ◎ |

On the other hand, as shown in comparative example 1, in a case where Rz1 was within a desired range and Rz2 was less than a desired range, external light reflection preventive properties was poor and visibility was bad.

In addition, as shown in comparative example 2, in a case where Rz1 was within a desired range and Rz2 was more than a desired range, visibility was bad because of whitening.

In addition, as shown in comparative example 3, in a case where Rz1 was within a desired range and Rz2 was less than a desired range, visibility was bad while external light reflection preventive properties was poor. In addition, dazzling occurred because haze was equal to or less than 30%.

In addition, as shown in comparative example 4, in a case where Rz1 was within a desired range and Rz2 was more than a desired range, visibility was bad because of whitening. In addition, contrast was bad because haze was more than 39%.

As mentioned above, by setting Rz1 at 0.4-0.9 $\mu$m and Rz2 at 0.02-0.06 $\mu$m, an antiglare film without whitening, wherein external light reflection preventive properties was good, was obtained. Further, by setting haze at 30-39%, an antiglare film with little dazzling and good contrast was obtained.

What is claimed is:

1. An antiglare film comprising:
a transparent substrate; and
an antiglare layer on the substrate, wherein concaves and convexes are formed in a surface of the layer;
wherein ten-point mean roughness (Rz1) of the surface is 0.4-0.9 $\mu$m when a cutoff value is 0.8 mm and ten-point mean roughness (Rz2) of the surface is 0.02-0.06 $\mu$m when a cutoff value is 0.008 mm,
wherein the ten-point mean roughness is determined as follows:
a reference length is sampled from a roughness curve in the direction of its mean line; and
the sum of the average value of absolute values of the heights of five highest profile peaks and the depths of five deepest profile valleys measured in the vertical magnification direction from the mean line of the sampled portion.

2. The antiglare film according to claim 1, wherein haze value of the layer is 30-39%.

3. The antiglare film according to claim 1, wherein the layer comprising a binder matrix and a particle which is an amorphous aggregate, and wherein a refractive index of the binder matrix is different from a refractive index of the particle.

4. The antiglare film according to claim 3, wherein difference in the refractive index between the binder matrix and the particle is 0.03-0.20.

5. The antiglare film according to claim 1, wherein the layer comprising a binder matrix, particle (A) which is an amorphous aggregate and particle (B) which is spherical, and wherein a refractive index of particle (A) or particle (B) is different from a refractive index of the binder matrix.

6. The antiglare film according to claim 5, wherein difference in the refractive index between the binder matrix and particle (A) is 0.03-0.20, and wherein difference in the refractive index between the binder matrix and particle (B) is 0.03-0.20.

7. The antiglare film according to claim 5, wherein total content of particle (A) and particle (B) in the layer is 10-40 wt % based on content of the binder matrix.

8. A transmission type liquid crystal display comprising:
an antiglare film according to claim 1;
a polarizing plate;
a liquid crystal cell;
a polarizing plate; and
a backlight unit.

* * * * *